(12) United States Patent
Tsurumi

(10) Patent No.: US 10,175,825 B2
(45) Date of Patent: Jan. 8, 2019

(54) INFORMATION PROCESSING APPARATUS, INFORMATION PROCESSING METHOD, AND PROGRAM FOR DETERMINING CONTACT ON THE BASIS OF A CHANGE IN COLOR OF AN IMAGE

(71) Applicant: SONY CORPORATION, Tokyo (JP)

(72) Inventor: Shingo Tsurumi, Saitama (JP)

(73) Assignee: SONY CORPORATION, Tokyo (JP)

( * ) Notice: Subject to any disclaimer, the term of this patent is extended or adjusted under 35 U.S.C. 154(b) by 18 days.

(21) Appl. No.: 15/319,440

(22) PCT Filed: Jul. 14, 2015

(86) PCT No.: PCT/JP2015/003560
§ 371 (c)(1),
(2) Date: Dec. 16, 2016

(87) PCT Pub. No.: WO2016/017096
PCT Pub. Date: Feb. 4, 2016

(65) Prior Publication Data
US 2017/0139545 A1    May 18, 2017

(30) Foreign Application Priority Data
Jul. 30, 2014   (JP) ................. 2014-155227

(51) Int. Cl.
*G06F 3/042* (2006.01)
*G06T 7/73* (2017.01)
*G06T 7/90* (2017.01)

(52) U.S. Cl.
CPC .......... *G06F 3/0425* (2013.01); *G06F 3/0426* (2013.01); *G06T 7/73* (2017.01); *G06T 7/90* (2017.01)

(58) Field of Classification Search
CPC ........... G06F 3/0425; G06T 7/73; G06T 7/90
See application file for complete search history.

(56) References Cited

U.S. PATENT DOCUMENTS

| | | | | |
|---|---|---|---|---|
| 2014/0253513 | A1* | 9/2014 | Matsubara | G06F 3/0425 345/175 |
| 2015/0109197 | A1* | 4/2015 | Takagi | G06F 3/011 345/156 |

FOREIGN PATENT DOCUMENTS

| | | |
|---|---|---|
| JP | 2005-165670 | 6/2005 |
| JP | 2011-070491 | 4/2011 |
| JP | 2012-022664 | 2/2012 |
| JP | 2014-071505 | * 4/2014 |
| WO | WO2013/168508 | 11/2013 |
| WO | WO2014/034527 | 3/2014 |

* cited by examiner

*Primary Examiner* — Lisa Landis
(74) *Attorney, Agent, or Firm* — Paratus Law Group, PLLC

(57) ABSTRACT

There is provided an information processing apparatus, an information processing method, and a program that are capable of detecting contact with high precision from an image picked-up by a normal camera, the information processing apparatus including a contact determination unit. The contact determination unit determines contact of an operation body with a target object on the basis of a change in a color of an image including the target object and the operation body.

18 Claims, 13 Drawing Sheets

(d)

(c)   (a)   (b)

(e)

(a)

(b)

INFORMATION PROCESSING APPARATUS, INFORMATION PROCESSING METHOD, AND PROGRAM FOR DETERMINING CONTACT ON THE BASIS OF A CHANGE IN COLOR OF AN IMAGE

CROSS REFERENCE TO PRIOR APPLICATION

This application is a National Stage Patent Application of PCT International Patent Application No. PCT/JP2015/003560 (filed on Jul. 14, 2015) under 35 U.S.C. § 371, which claims priority to Japanese Patent Application No. 2014-155227 (filed on Jul. 30, 2014), which are all hereby incorporated by reference in their entirety.

TECHNICAL FIELD

The present technology relates to an information processing apparatus, and information processing method, and a program that are capable of detecting contact.

BACKGROUND ART

In recent years, along with diversification of utilization forms of information processing equipment, a new UI (user interface) is being researched. For example, a technology in which an icon is displayed on a head-mounted display, the icon is projected on a target object (e.g., palm and desk), and selection of the icon is input when the operation body (e.g., finger and stylus) touches the projected icon is developed.

For contact of the operation body with the target object, a stereo camera, a 3D sensor, or the like is used. The UI recognizes the target object and the operation body, and detects the position of the operation body and the plane shape of the target object on the basis of 3D information acquired from the stereo camera, 3D sensor, or the like. The UI is capable of determining, as the contact, the distance between the target object and the operation body being equal to or less than a predetermined value.

Patent Document 1: Japanese Patent Application Laid-open No. 2011-70491

SUMMARY

Problem to be Solved

However, in the above-mentioned method, it needs to provide a detection means such as a stereo camera and a 3D sensor for detecting contact, and there is a problem of increase in size of the device, increase in power consumption, and increase in cost. Further, it is difficult to use the stereo camera and 3D sensor under sunlight because of the properties thereof. Further, a user's unintended input may be made in the case where non-contact is determined as contact when the operation body approaches the target object.

In view of the circumstances as described above, it is an object of the present technology to provide an information processing apparatus, an information processing method, and a program that are capable of detecting contact with high precision from an image picked-up by a normal camera.

Means for Solving the Problem

In order to achieve the above-mentioned object, an information processing apparatus according to an embodiment of the present technology include a contact determination unit that determines contact of an operation body with a target object on the basis of a change in a color of an image including the target object and the operation body.

With this configuration, because a change in color is used for detection of contact between the target object and the operation body, it is possible to perform contact detection from an image picked up by a general camera. Note that the color is the same meaning as the pixel value, and includes brightness.

The information processing apparatus may further include an object recognition processing unit that recognizes the operation body included in the image, in which the contact determination unit may determine contact of the operation body with the target object on the basis of a change in a color of the operation body.

With this configuration, because the object recognition processing unit recognizes the operation body (e.g., finger and stylus), the contact determination unit is capable of detecting contact by using the change in a color of the recognized operation body.

The object recognition processing unit may use an object detection dictionary to recognize the operation body.

The object recognition processing unit is capable of recognizing the operation body by checking an image against the object detection dictionary in which information on objects that can be the operation body is stored.

The object recognition processing unit may recognize an object that has entered the image as the operation body.

When an object newly enters the image (image-pickup range of a camera), the object recognition processing unit is capable of recognizing the object as the operation body.

The contact determination unit may determine contact of the operation body with the target object on the basis of a change in a predetermined color.

By setting a color of an object (finger, stylus, or the like) that can be the operation body in advance, the contact determination unit is capable of detecting contact by using the change in the color even if the object of the operation body is recognized.

The predetermined color may be a color corresponding to a color of a finger of a fingertip.

The color of a fingertip is changed when the finger is in contact with a some kind of object. Therefore, the contact determination unit is capable of determining contact of the operation body with the target object by using the change in a color corresponding to the color of the fingertip when the operation body is the finger.

The contact determination unit may determine contact of the operation body with the target object on the basis of a change in a color of the operation body.

In the case where an object whose color (including brightness) is changed when the object is in contact with something is the operation body as in the above-mentioned color of the fingertip, the contact determination unit is capable of determining contact on the basis of a change in a color of the operation body.

The contact determination unit may determine contact of the operation body with the target object on the basis of a change in a color of the target object.

When the target object is an object whose color is changed in response to contact of the operation body, the contact determination unit may determine contact by using a change in a color of the target object.

The contact determination unit may determine contact of the operation body with the target object on the basis of a change in a color of the target object due to a shadow of the operation body.

The contact determination unit may determine contact by using a change in a color of the target object due to a shadow of the operation body. For example, because the shadow is deepened when the operation body approaches the target object, this may be used to determine contact.

The contact determination unit may further determine a degree of contact of the operation body on the target object on the basis of the change in the color of the image.

In the case where the change in a color of the operation body is different depending on the degree of contact, the contact determination unit is capable of using the change in a color to determine the degree of contact (pressing force).

The contact determination unit may further determine a direction of contact of the operation body with the target object on the basis of the change in the color of the image.

In the case where the change in a color of the operation body is different depending on the direction of contact, the contact determination unit is capable of using the change in a color to determine the direction of contact (pressing direction).

The information processing apparatus may further include an input control unit that controls an operation input on the basis of a determination result of the contact determination unit.

When the contact determination unit determines contact between the operation body and the target object, the input control unit is capable of receiving an operation input depending on the contact position or the number of contacts, and supplying it to the OS or the like.

The information processing apparatus may further include an image output unit that generates an operation target image superimposed on the target object, in which the input control unit may control an operation input on the basis of a contact position between the operation body and the target object in the operation target image.

The image output unit generates an operation target image that is displayed on an HMD (Head Mounted Display), projector, or the like, and superimposed on the target object. The input control unit is capable of calculating the positional relationship between the operation target image and the contact position on the basis of the contact position in the operation target image and the superimposition position of the operation target image on the target object, and receiving an operation input depending on the content (icon, etc.) of the operation target image superimposed on the contact position.

The information processing apparatus may further include an object recognition processing unit that recognizes the operation body included in the image, in which the input control unit may control an operation input on the basis of a shape of the operation body recognized by the object recognition processing unit and a determination result of the contact determination unit.

The object recognition processing unit may recognize the shape of the operation body (e.g., the shape of fingers at the time of pinching operation), and supply it to the input control unit. Accordingly, the input control unit is capable of receiving the operation input depending on the shape of the operation body.

The information processing apparatus may further include an object recognition processing unit that recognizes the target object included in the image, in which the contact determination unit may determine contact of the operation body with the target object on the basis of the change in the color of the image when the target object is a rigid body and contact of the operation body with the target object on the basis of a direction of a normal line on a surface of the target object acquired by a normal line direction detection sensor when the target object is not a rigid body.

Although the normal line direction on the surface of an object (direction perpendicular to the surface of the object) can be detected by the normal line direction detection sensor, and contact can be determined by using deformation of the target object due to contact, it is difficult to use it in the case where the target object is a rigid body (object that is not deformed). On the other hand, contact can be determined by using the change in a color of the image even if the target object is a rigid body.

The contact determination unit may determine contact of the operation body with the target object on the basis of the change in the color of the image when a distance between the target object and the operation body acquired by a depth sensor is equal to or less than a predetermined value.

The depth sensor is capable of measuring the distance between the sensor and the object by using a projection pattern of an infrared ray or the like. In the case where the distance between the target object and the operation body is equal to or lower than a predetermined value, the contact determination unit determines contact on the basis of the change in a color of the image. Accordingly, it is possible to determine contact only in the case where the possibility of contact is high.

In order to achieve the above-mentioned object, a program according to an embodiment of the present technology causes an information processing apparatus to function as a contact determination unit that determines contact of an operation body with a target object on the basis of a change in a color of an image including the target object and the operation body.

In order to achieve the above-mentioned object, an information processing method according to an embodiment of the present technology includes determining, by a contact determination unit, contact of an operation body with a target object on the basis of a change in a color of an image including the target object and the operation body.

Effects

As described above, according to the present technology, it is possible to provide an information processing apparatus, an information processing method, and a program that are capable of detecting contact with high precision from an image picked-up by a normal camera. It should be noted that the effect described here is not necessarily limitative and may be any effect described in the present disclosure.

DESCRIPTION OF PREFERRED EMBODIMENTS

First Embodiment

An information processing apparatus according to a first embodiment of the present technology will be described.

(Configuration of Information Processing Apparatus)

Figure 1:
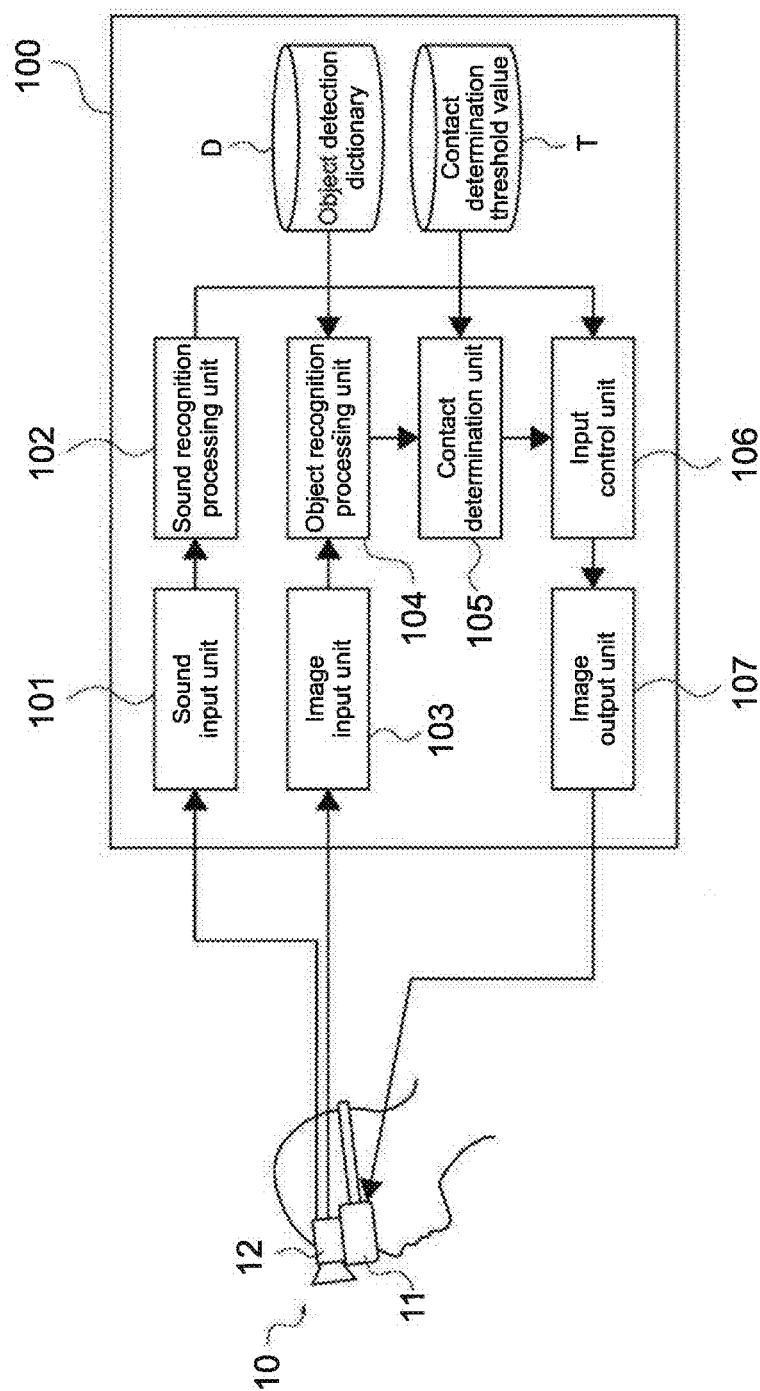
FIG. 1 A schematic diagram showing the configuration of an information processing apparatus according to a first embodiment of the present technology.

FIG. 1 is a schematic diagram showing the functional configuration of an information processing apparatus 100 according to a first embodiment of the present technology. As shown in the figure, the information processing apparatus 100 includes a sound input unit 101, a sound recognition processing unit 102, an image input unit 103, an object recognition processing unit 104, a contact determination unit 105, an input control unit 106, and an image output unit 107.

As shown in the figure, the information processing apparatus 100 can be connected to an eyewear 10. Further, the information processing apparatus 100 may be mounted on the eyewear 10. The eyewear 10 includes a display 11, a camera 12, and a microphone (not shown). The display 11 can be a see-through HMD (Head Mounted Display), and the camera 12 can be a general camera for picking up an image (moving image).

The sound input unit 101 is connected to the microphone of the eyewear 10. The audio signal of a sound collected by the microphone is input to the sound input unit 101. The sound input unit 101 outputs the acquired audio signal to the sound recognition processing unit 102.

The sound recognition processing unit 102 performs audio recognition processing on the audio signal supplied from the sound input unit 101, and recognizes the operation sound by a user. In the case where the operation sound is recognized, the sound recognition processing unit 102 supplies the recognition result to the input control unit 106.

The image input unit 103 is connected to the camera 12. An image (moving image) picked up by the camera 12 is input to the image input unit 103. The image input unit 103 supplies the image acquired from the camera 12 (hereinafter, acquired image) to the object recognition processing unit 104.

The object recognition processing unit 104 checks the acquired image supplied from the image input unit 103 against information stored in an object detection dictionary D to recognize an object. The object recognition processing unit 104 is capable of recognizing an object such as an operation body and a target object to be described later. The object recognition processing unit 104 supplies the acquired image and the object recognition result to the contact determination unit 105. The object detection dictionary D may be stored in the information processing apparatus 100, or the object recognition processing unit 104 may acquire the object detection dictionary D from a network or the like.

The contact determination unit 105 performs contact determination on the acquired image supplied from the object recognition processing unit 104 by using the object recognition result and a contact determination threshold value T. Details of this processing will be described later. The contact determination unit 105 supplies the determination result to the input control unit 106. The contact determination threshold value T may be stored in the information processing apparatus 100, or the contact determination unit 105 may acquire the contact determination threshold value T from a network or the like.

The input control unit 106 controls an operation input by a user on the basis of the recognition result supplied from the sound recognition processing unit 102 or the determination result supplied from the contact determination unit 105. Specifically, the input control unit 106 receives the contact position, pressing force, or pressing direction of an operation body with a target object, movement of an operation body after the contact, or the like, as an operation input of touching, multi-touching, dragging, pinching, or the like. The input control unit 106 supplies the received operation input to the OS of the information processing apparatus 100 or the like.

The image output unit 107 generates an image (moving image) displayed on the display 11. The image output unit 107 is capable of generating an operation image including an icon and an operation button. As described above, the display 11 is a see-through HMD, and the user visually confirms the field of view in which videos displayed on the display 11 and the real object are superimposed one another.

Figure 2:
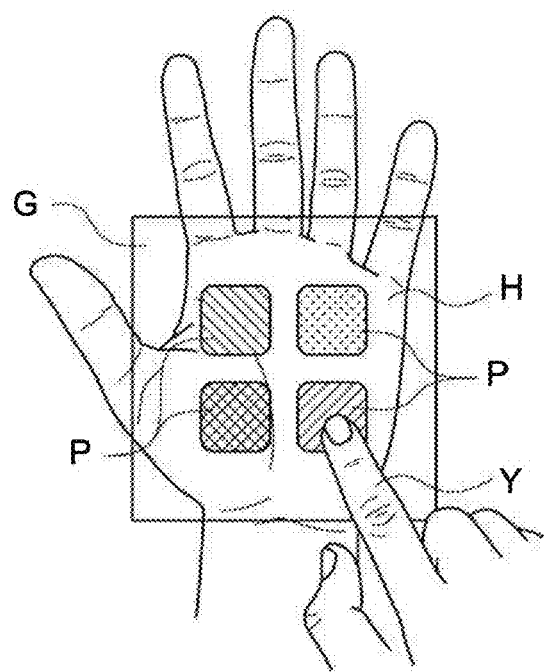
FIG. 2 A schematic diagram showing an operation image superimposed on a target object, which is generated by an image output unit of the information processing apparatus.

FIG. 2 schematically shows a user's field of view via the display 11. The user's field of view includes a palm H of the user, a finger Y of the user, and an operation image G displayed on the display 11. The operation image G includes icons P. When the user touches a part of the palm H on which the icon P is superimposed with the finger Y, the information processing apparatus 100 receives selection of the icon P.

Figure 3:
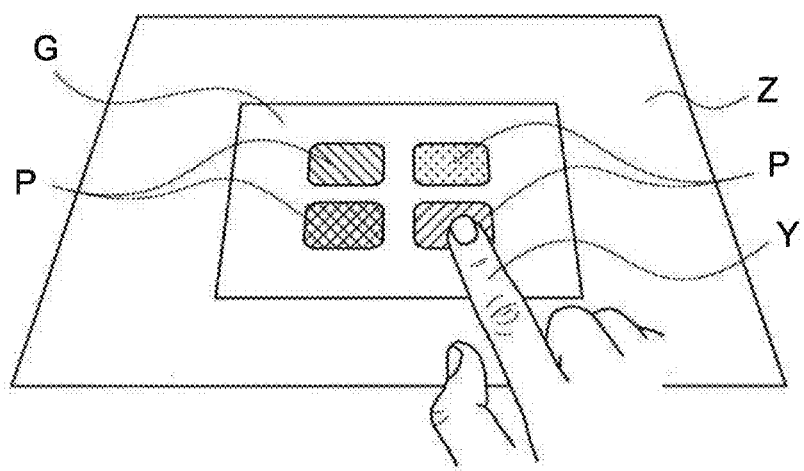
FIG. 3 A schematic diagram showing the operation image superimposed on the target object, which is generated by the image output unit of the information processing apparatus.

The operation image G does not necessarily need to be superimposed on the palm. FIG. 3 is a schematic diagram showing the state where the operation image G is superimposed on a magazine Z. As shown in the figure, when the user touches a part of the magazine Z on which the icon P is superimposed with the finger Y, the information processing apparatus 100 receives selection of the icon P. Further, the user may designate the icon P with a thing other than the finger such as a stylus. Hereinafter, an object (e.g., the palm H and the magazine Z) on which the operation image G is projected, which is designated by the user, is referred to as the target object, and an object (e.g., the finger Y and the stylus) that is in contact with the target object and designates the icon P is referred to as the operation body. Specifically, the information processing apparatus 100 detects contact of the operation body with the target object, and receives an operation input in response to the contact.

Figure 4:
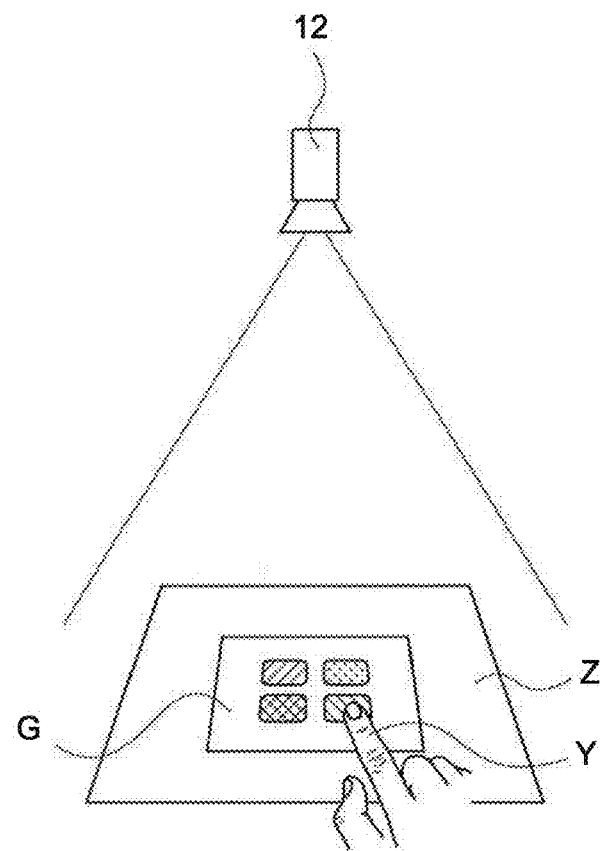
FIG. 4 A schematic diagram showing the operation image superimposed on the target object, which is generated by the image output unit of the information processing apparatus.

The configuration of the eyewear 10 is not limited to the above-mentioned configuration. FIG. 4 shows the state where the camera 12 is provided independent of the eyewear 10. The operation image G is displayed on the display 11, and superimposed on the magazine Z. The camera 12 is provided at a position (e.g., on the upper side of the magazine Z) different from that of the eyewear 10, and is connected to the image input unit 103.

Further, the information processing apparatus 100 may be connected to an image projection apparatus different from the eyewear 10. For example, it may be connected to a projector including a camera capable of projecting videos on a desk or wall surface and imaging a projection surface. In this case, the image output unit 107 is connected to an image projection mechanism of the projector, and projects videos on the target object (desk or wall). The image input unit 103 is connected to the camera, and acquires an image including the target object and the projected image. Alternatively, the information processing apparatus 100 may be connected to an apparatus including a camera capable of displaying or projecting videos on the target object and imaging the target object.

The above-mentioned functional configuration of the information processing apparatus 100 may be connected or incorporated to/in an image projection apparatus such as an eyewear and a projector, or mounted on a PC, smartphone, or the like different from the image projection apparatus. Further, the whole or a part of the functional configuration may be on a network.

Figure 5:
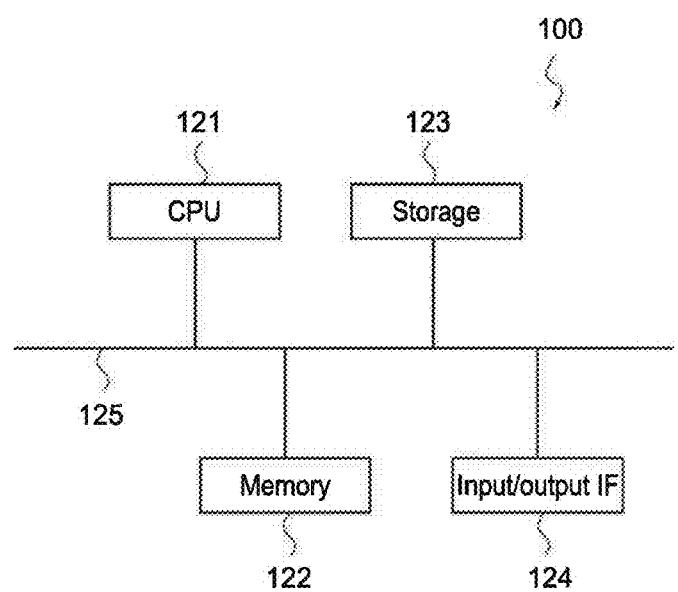
FIG. 5 A schematic diagram showing a hardware configuration of the information processing apparatus.

FIG. 5 is a schematic diagram showing the hardware configuration of the information processing apparatus 100. The above-mentioned configuration of the information processing apparatus 100 is a functional configuration achieved by cooperation of the hardware configuration shown in FIG. 5 and a program.

As shown in FIG. 5, the information processing apparatus 100 includes a CPU 121, a memory 122, a storage 123, and an input/output IF 124 as a hardware configuration. These are connected to each other by a bus 125.

The CPU (Central Processing Unit) 121 controls another configuration in accordance with a program stored in the memory 122, performs data processing in accordance with the program, and stores the processing result in the memory 122. The CPU 121 can be a microprocessor.

The memory 122 stores a program executed by the CPU 121 and data. The memory 122 can be a RAM (Random Access Memory).

The storage 123 stores a program or data. The storage 123 can be an HDD (Hard disk drive) or an SSD (solid state drive). The storage 123 stores the above-mentioned object detection dictionary D or the above-mentioned contact determination threshold value T.

The input/output IF (interface) 124 receives an input to the information processing apparatus 100, and supplies an output of the information processing apparatus 100 to the display 11 or the like. The input/output IF 124 includes input equipment such as a mouse and a touch panel, output equipment such as the display 11, and a connection interface such as a network. As described above, the information processing apparatus 100 is capable of receiving a user's operation input on the basis of the image acquired by the image input unit 103. In this case, the input is received not via the input/output IF 124. The image generated by the image output unit 107 is output to the display 11 via the input/output IF 124, and displayed.

The hardware configuration of the information processing apparatus 100 is not limited to those described herein as long as the above-mentioned functional configuration of the information processing apparatus 100 can be achieved.

(Contact Determination Operation of Information Processing Apparatus)

Figure 6:
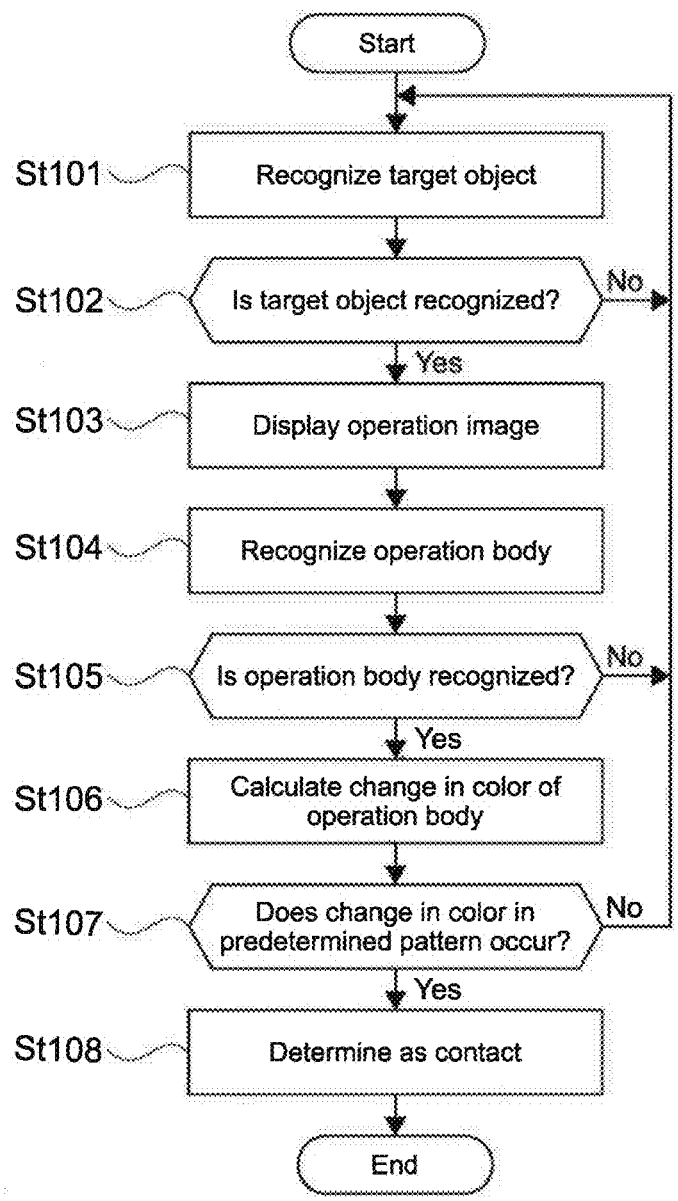
FIG. 6 A flowchart showing an operation of the information processing apparatus.

An operation of the information processing apparatus 100 will be described. FIG. 6 is a flowchart showing the operation of the information processing apparatus 100. As described above, the camera 12 picks up an image, and the image input unit 103 acquires the image (acquired image). The image input unit 103 supplies the acquired image to the object recognition processing unit 104.

The object recognition processing unit 104 recognizes the target object (St101). The object recognition processing unit 104 recognizes the target object by checking the acquired image acquired from the image input unit 103 against the object detection dictionary D. Accordingly, when the acquired image includes a palm, magazine, or the like, for example, it is recognized as the target object.

In the case where the target object is detected in the acquired image (St102: Yes), the image output unit 107 supplies the operation image G (see FIG. 2) to the display 11, and causes the display 11 to display the operation image G (St103). In the case where no target object is detected in the acquired image (St102: No), recognition of the target object by the object recognition processing unit 104 (St101) is performed again.

Next, the object recognition processing unit 104 recognizes the operation body (St104). The object recognition processing unit 104 recognizes the operation body by checking the acquired image against the object detection dictionary D. Accordingly, when the acquired image includes a finger, stylus, or the like, for example, it is recognized as the operation body. Note that the object recognition processing unit 104 may recognize a plurality of operation bodies.

In the case where the operation body is detected in the acquired image (St105: Yes), the contact determination unit 105 calculates a change in a color of the operation body (St106). The color represents the pixel value (RGB value), and includes a brightness (light and dark of color). The contact determination unit 105 captures a change in a color of the operation body with the lapse of imaging time. In the case where no operation body is detected in the acquired image (St105: No), recognition of the target object by the object recognition processing unit 104 (St101) is performed again.

Figure 7:
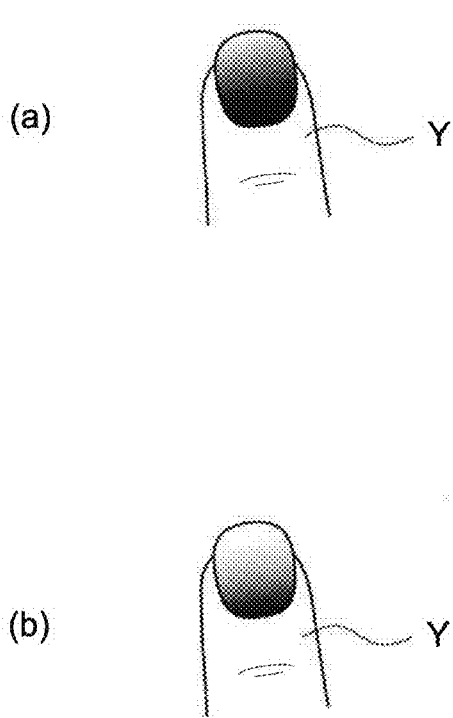
FIG. 7 A schematic diagram showing the state of a change in a color of an operation body due to contact.

FIG. 7 shows an example in which the finger Y is recognized as the operation body. The contact determination unit 105 is capable of calculating a change in a color of a fingertip (inside of a nail) of the finger Y. Part (a) of FIG. 7 shows the state where the finger Y is not in contact with the target object, and part (b) of FIG. 7 shows the state where the finger Y is in contact with the target object. The gray area in the figure represents the color of the fingertip. When the finger Y is in contact with the target object, the color of the fingertip is changed from that shown in part (a) of FIG. 7 to that shown in part (b) of FIG. 7.

The contact determination unit 105 compares the change in a color of the operation body with the contact determination threshold value T, and determines that the operation body is in contact with the target object (St108) when the change in the color is a change in a predetermined pattern defined by the contact determination threshold value T (St107: Yes). For example, the contact determination unit 105 can determine that the finger Y is in contact with the target object when the color of the fingertip shown in part (a) of FIG. 7 is changed to that shown in part (b) of FIG. 7. In the case where the object recognition processing unit 104 recognizes a plurality of operation bodies, the contact determination unit 105 is capable of determining contact for each operation body.

The pattern of a change in a color (the contact determination threshold value T) used by the contact determination unit 105 for determination may be determined in accordance with a some kind of rule (e.g., lightening of the color of a free edge of the nail as shown in FIG. 7 is determined as contact) or machine learning in which contact determination is repeated for many subjects. Further, the contact determination unit 105 may store the tendency of the color of a fingertip of a user using the information processing apparatus 100, and perform calibration of the contact determination threshold value T.

In the case where the change in a color of the target object is not a change in the predetermined pattern (St107: No), recognition of the target object by the object recognition processing unit 104 (St101) is performed again.

In the case where contact of the operation body with the target object is determined, the contact determination unit 105 supplies, to the input control unit 106, the contact position with the acquired image. The input control unit 106 controls an operation input on the basis of the position of the icon P displayed on the operation image G and the contact position supplied from the contact determination unit 105. The input control unit 106 can regard the icon P superimposed on the contact position as being selected, for example.

The information processing apparatus 100 performs such an operation. As described above, the information processing apparatus 100 performs contact determination by using an image picked up by a normal camera. Specifically, it does not need to provide a contact detection means such as a 3D sensor and a stereo camera, and it is possible to reduce the size of the device and the cost. Further, because the change in a color of the target object does not occur unless the operation body is in contact with the target object, i.e., the information processing apparatus 100 performs contact determination only in the case where the operation body is certainly in contact with the target object, it is possible to receive an operation input with high precision.

Note that although the case where a finger is the operation body has been described above, the operation body is not limited to the finger. For example, in the case where a stylus is the operation body, contact determination may be performed by using the change in a color of the stylus due to deformation of the stylus caused by contact with the target object. Alternatively, a stylus whose color is changed or a stylus that emits light when the stylus is in contact with something may be used as the operation body.

Further, although the contact determination unit 105 performs contact determination by using the change in a color of the operation body in the above description, this is not limited thereto. Contact determination may be performed by using the change in a color of the target object. For example, in the case where the target object is a palm, the color of the palm is changed when the operation body is in contact with it. The contact determination unit 105 may perform contact determination by using it. Further, in some liquid crystal displays, a color of the liquid crystal surface is changed when no image is displayed and the liquid crystal is touched. The contact determination unit 105 may perform contact determination by using this change in a color of the liquid crystal surface. Further, in the case where the target object is soft, the target object is deformed (depression is formed) when the operation body is in contact with it. The contact determination unit 105 may perform contact determination by using the change in a color due to this deformation.

Further, the contact determination unit 105 may perform contact determination by using a shadow of the operation body. When the operation body approaches the target object to some extent, the shadow of the operation body is cast on the target object. The contact determination unit 105 may determine that the operation body is in contact with the target object on the basis of the change in a color of the target object due to the shadow of the operation body when the shadow is in contact with the operation body.

Further, the object recognition processing unit 104 checks the acquired image against the object detection dictionary D to recognize the object (the target object and the operation body) in the above. However, this is not limited thereto. For example, in the case where the acquired image is not changed for a predetermined time and a some kind of object enters the acquired image (i.e., the imaging range of the camera), this object may be recognized as the operation body. The contact determination unit 105 is capable of performing contact determination by using the change in a color of the object.

(Contact Determination Operation of Information Processing Apparatus Combined by Use of Normal Line Direction)

Another operation of the information processing apparatus 100 will be described. Note that the camera 12 of the eyewear 10 (or another apparatus) connected to the information processing apparatus 100 is a camera capable of performing polarization imaging. The polarization imaging is a technology by which a brightness image in the imaging range and the direction of a normal line (line vertical to the surface of an object) in the imaging range can be acquired. Further, the camera 12 may acquire the normal line direction of the object with a method different from the polarization imaging, and the eyewear 10 may further include a sensor capable of acquiring the normal line direction in addition to the camera 12.

Figure 8:
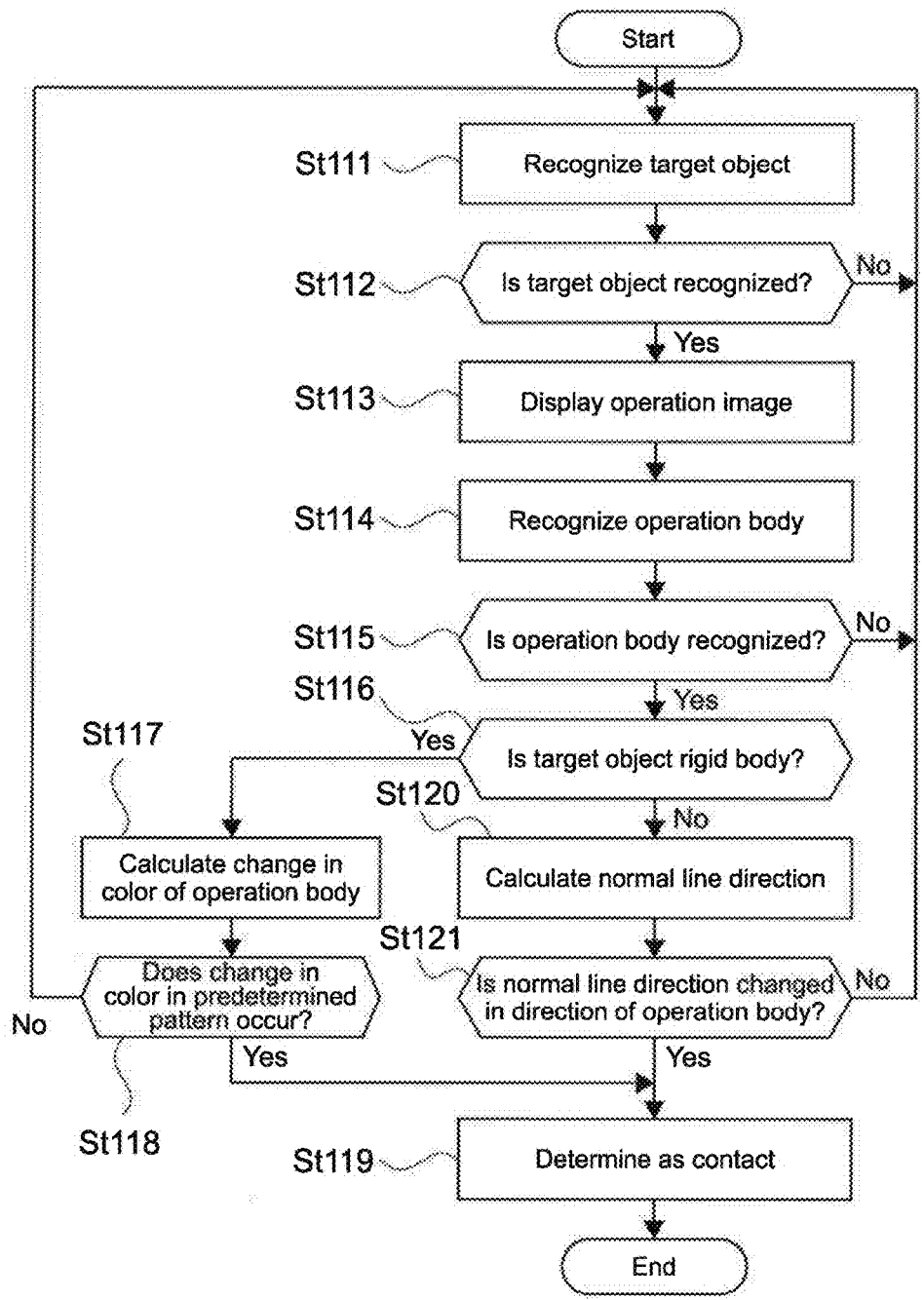
FIG. 8 A flowchart showing an operation of the information processing apparatus.

FIG. 8 is a flowchart showing another operation of the information processing apparatus 100. As described above, the camera 12 picks up an image, and the image (acquired image) is acquired by the image input unit 103. The image input unit 103 supplies the acquired image to the object recognition processing unit 104.

The object recognition processing unit 104 recognizes the target object (St111). The object recognition processing unit 104 recognizes the target object by checking the acquired image supplied from the image input unit 103 against the object detection dictionary D. Accordingly, when the acquired image includes a palm, magazine, or the like, for example, it is recognized as the target object.

In the case where the target object is detected in the acquired image (St112: Yes), the image output unit 107 supplies the operation image G (see FIG. 2) to the display 11, and causes the display 11 to display the operation image G (St113). In the case where no target object is detected in the acquired image (St112: No), recognition of the target object by the object recognition processing unit 104 (St111) is performed again.

Next, the object recognition processing unit 104 recognizes the operation body (St114). The object recognition processing unit 104 recognizes the operation body by checking the acquired image against the object detection dictionary. Accordingly, when the acquired image includes a finger, stylus, or the like, for example, it is recognized as the operation body. Note that the object recognition processing unit 104 may recognize a plurality of operation bodies.

Next, the object recognition processing unit 104 determines whether or not the target object is a rigid body (St116). The "rigid body" represents an object that is not deformed by contact of another object. Examples of the rigid body include a desk. The palm or magazine is determined not to be a rigid body. In the case where the target object is a rigid body (St116: Yes), the contact determination unit 105 calculates the change in a color of the operation body (St117).

After that, the contact determination unit 105 compares the change in a color of the operation body with the contact determination threshold value T, and determines that the operation body is in contact with the target object (St119) when the change in the color is a change in a predetermined pattern defined by the contact determination threshold value T (St118: Yes) as described above. In the case where the change in a color of the operation body is not a change in the predetermined pattern (St118: No), recognition of the target object by the object recognition processing unit 104 (St111) is performed again.

In the case where the object recognition processing unit 104 determines that the target object is not a rigid body, (St116: No), the contact determination unit 105 calculates a normal line direction of the surface of the target object in the vicinity of the operation body from the acquired image (St120). In the case where the camera 12 has a polarization imaging function as described above, a normal line direction of the surface of the target object can be acquired from the acquired image. Further, the object recognition processing unit 104 may calculate a normal line direction of the surface of the target object from the output of a sensor different from the camera 12.

The contact determination unit 105 determines contact of the operation body with the target object on the basis of a change in a normal line direction of the surface of the target object (St121). In the case where the target object is not a rigid body, the surface of the target object is depressed by contact of the operation body, and a normal line on the surface of the target object is inclined toward the operation body. Therefore, the contact determination unit 105 is capable of determining contact of the operation body with the target object on the basis of the change in a normal line direction on the surface of the target object. Specifically, the contact determination unit 105 determines that the operation body is in contact with the target object (St119) when the normal line direction on the surface of the target object is changed in the direction of the operation body (St121: Yes). In the case where the normal line direction on the surface of the target object is not changed in the direction of the operation body (St121: No), recognition of the target object by the object recognition processing unit 104 (St111) is performed again.

In the case where contact of the operation body with the target object is determined, the contact determination unit 105 supplies, to the input control unit 106, the contact position with the acquired image. The input control unit 106 controls an operation input on the basis of the position of the icon P displayed on the operation image G and the contact position supplied from the contact determination unit 105. The input control unit 106 can regard the icon P superimposed on the contact position as being selected, for example.

The information processing apparatus 100 is capable of performing also such an operation. In the case where the target object is a rigid body, the surface of the target object is not deformed even if the operation body is in contact with the target object, and it is difficult to perform contact determination using the normal line direction. In this regard, the information processing apparatus 100 may perform contact determination by using the change in a color of the acquired image in the case where the target object is a rigid body, and by using the normal line direction in the case where the target object is not a rigid body.

(Contact Determination Operation of Information Processing Apparatus Combined by Use of Depth Information)

Another operation of the information processing apparatus 100 will be described. Note that a depth sensor capable of acquiring depth information is provided to the eyewear 10 (or another apparatus) connected to the information processing apparatus 100. The depth information is information that represents the distance between an object and a depth sensor.

Figure 9:
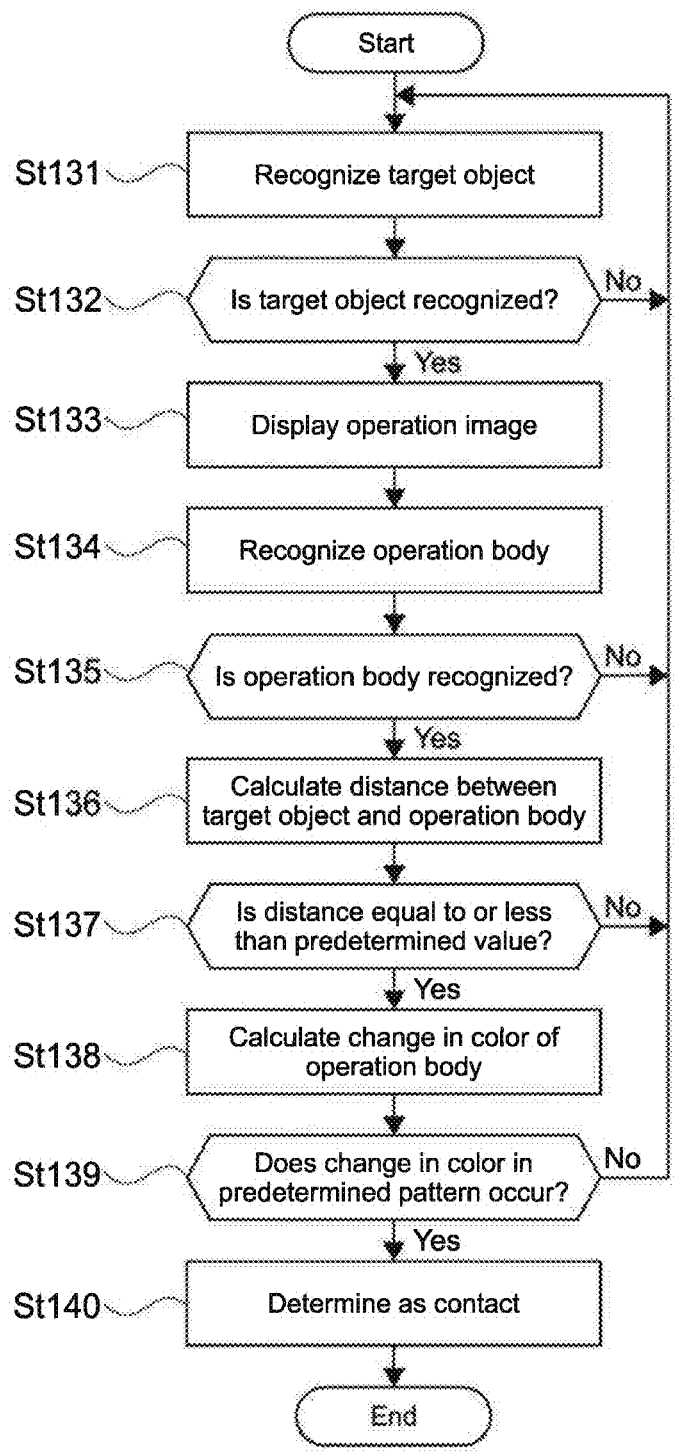
FIG. 9 A flowchart showing an operation of the information processing apparatus.

FIG. 9 is a flowchart showing another operation of the information processing apparatus 100. As described above, the camera 12 picks up an image, and the image (acquired image) is acquired by the image input unit 103. The image input unit 103 supplies the acquired image to the object recognition processing unit 104.

The object recognition processing unit 104 recognizes the target object (St131). The object recognition processing unit 104 recognizes the target object by checking the acquired image acquired from the image input unit 103 against the object detection dictionary D. Accordingly, when the acquired image includes a palm, magazine, or the like, for example, it is recognized as the target object.

In the case where the target object is detected in the acquired image (St132: Yes), the image output unit 107 supplies the operation image G (see FIG. 2) to the display 11, and causes the display 11 to display the operation image G (St133). In the case where no target object is detected in the acquired image (St132: No), recognition of the target object by the object recognition processing unit 104 (St131) is performed again.

Next, the object recognition processing unit 104 recognizes the operation body (St134). The object recognition processing unit 104 recognizes the operation body by checking the acquired image against the object detection dictionary D. Accordingly, when the acquired image includes a finger, stylus, or the like, for example, it is recognized as the operation body. Note that the object recognition processing unit 104 may recognize a plurality of operation bodies.

In the case where the operation body is detected in the acquired image (St135: Yes), the contact determination unit 105 calculates the distance between the operation body and the target object by using the depth information (St136). The contact determination unit 105 is capable of acquiring the depth information from the depth sensor, as described above. In the case where no operation body is detected in the acquired image (St135: No), recognition of the target object by the object recognition processing unit 104 (St131) is performed again.

In the case where the distance between the operation body and the target object is equal to or less than a predetermined value set in advance (St137: Yes), the contact determination unit 105 calculates the change in a color of the operation body (St138). In the case where the distance between the operation body and the target object is larger than the predetermined value (St137: No), recognition of the target object by the object recognition processing unit 104 (St131) is performed again.

Thereafter, the contact determination unit 105 compares the change in a color of the operation body with the contact determination threshold value T, and determines that the operation body is in contact with the target object (St140) when the change in the color is a change in a predetermined pattern defined by the contact determination threshold value T (St139: Yes) as described above. In the case where the change in a color of the operation body is not a change in the predetermined pattern (St139: No), recognition of the target object by the object recognition processing unit 104 (St131) is performed again.

In the case where contact of the operation body with the target object is determined, the contact determination unit 105 supplies, to the input control unit 106, the contact position with the acquired image. The input control unit 106 controls an operation input on the basis of the position of the icon P displayed on the operation image G and the contact position supplied from the contact determination unit 105. The input control unit 106 can regard the icon P superimposed on the contact position as being selected, for example.

The information processing apparatus 100 is capable of performing also such an operation. By using the depth information, the information processing apparatus 100 is capable of acquiring the distance between the operation body and the target object, and performing contact determination by using the change in a color of the acquired image only in the case where the distance between the operation body and the target object is sufficiently small and the possibility of contact is high.

(Contact and Operation Determination Operations of Information Processing Apparatus)

Figure 10:
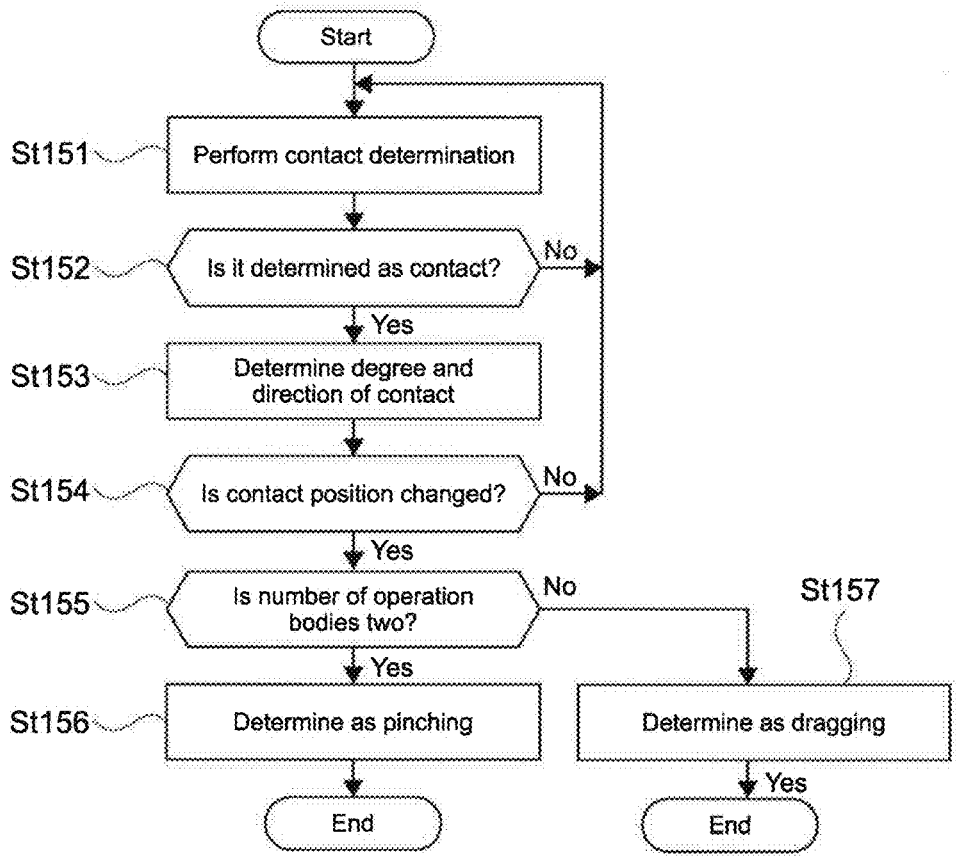
FIG. 10 A flowchart showing an operation of the information processing apparatus.

The information processing apparatus 100 is capable of determining the type (dragging, pinching, etc.) of a contact operation as well as contact between the operation body and the target object. FIG. 10 is a flowchart showing contact and operation determination operations of the information processing apparatus 100.

The flow of the step of contact determination (St151) is the same as that of the contact determination operation shown in FIG. 6. Further, the flow of the same step (St151) may be the same as that of the contact determination operation combined by the usage of a normal lien direction shown in FIG. 8 or the contact reaction operation combined by the usage of depth information shown in FIG. 9.

In the case where contact is determined in the contact determination step (St152: Yes), the contact determination unit 105 determines the degree and direction of contact (pressing) of the operation body with the target object (St153). In the case where no contact is determined in the contact determination step (St152: No), the step of contact determination (St151) is repeated.

Figure 11:
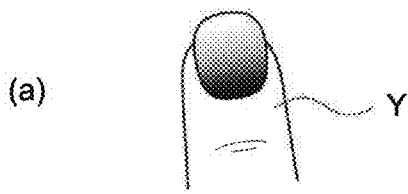
FIG. 11 A schematic diagram showing the state of a change in a color of the operation body depending on the degree of contact.
Figure 11:

The contact determination unit 105 is capable of determining the degree and direction of contact (pressing) of the operation body with the target object by using the change in a color of the operation body. FIG. 11 is a schematic diagram showing the state of a change in a color due to the degree of contact of the operation body (finger) with the target object. As shown in the figure, in the case where the operation body is the finger Y, the degree of change in the color is different between the case where the pressing force is small as shown in part (a) in FIG. 11 and the case where the pressing force is large as shown in part (b) in FIG. 11. The contact determination unit 105 is capable of determining the degree of the pressure of the operation body on the target object by comparing the change in the color with the pattern of the change in the color depending on the pressing force (the contact determination threshold value T). Note that the operation body is not limited to the finger Y as long as the color thereof is changed depending on the degree of the pressing force on another object.

Figure 12:
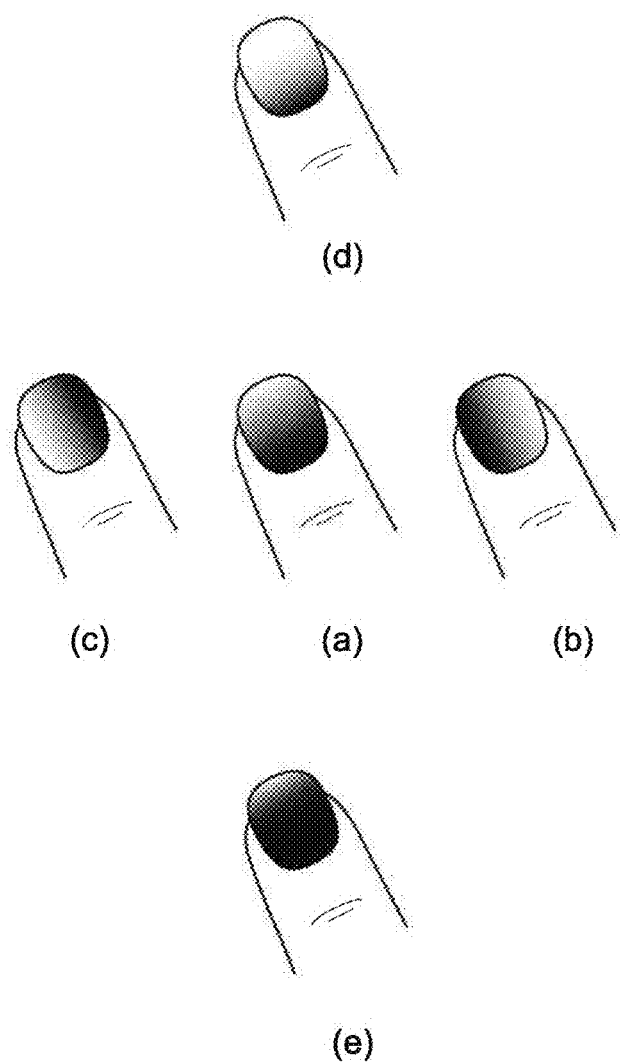
FIG. 12 A schematic diagram showing the state of a change in a color of the operation body depending on the contact direction.

FIG. 12 is a schematic diagram showing the state of the change in a color depending on the direction of contact of the operation body (finger) with the target object. Part (a) of FIG. 12 represents the case where the pressing direction is perpendicular to the target object, part (b) of FIG. 12 represents the case where the pressing direction is a right direction, part (c) of FIG. 12 represents the case where the pressing direction is a left direction, part (d) of FIG. 12 represents the case where the pressing direction is an upper direction, and part (e) of FIG. 12 represents the case where the pressing direction is a lower direction.

As shown in the figure, in the case where the pressing direction is different, the position where the color is changed is different. The contact determination unit 105 is capable of determining the pressing direction of the operation body with the target object by comparing the change in the color with the pattern of the change in the color depending on the pressing direction (the contact determination threshold value T). Note that the operation body is not limited to the finger Y as long as the color thereof is different depending on the pressing direction on another object.

The contact determination unit 105 supplies, to the input control unit 106, the contact position with the acquired image and the degree of pressing force and pressing direction of the operation body on the target object. The input control unit 106 determines whether or not the contact position between the operation body and the target object is changed (St154). In the case where the contact position is changed (St154: Yes), the input control unit 106 determines whether or not the number of operation bodies is two (St155). In the case where the contact position is not changed (St155: No), the step of contact determination (St151) is performed again.

In the case where the number of operation bodies is two (St155: Yes), the input control unit 106 determines that the operation by the operation body is pinching. On the other hand, in the case where the number of operation bodies is not two, the input control unit 106 determines that the operation by the operation body is dragging. Note that in the case where the number of operation bodies is two, the input control unit 106 may determine it as dragging (multi-touch dragging) by a plurality of operation bodies in the case where the movement directions of the contact places are substantially in parallel with each other. Further, in the case where the operation by the operation body is pinching, the input control unit 106 may determine that the operation is pinching in or pinching out depending on the movement direction of the contact place.

Figure 13:
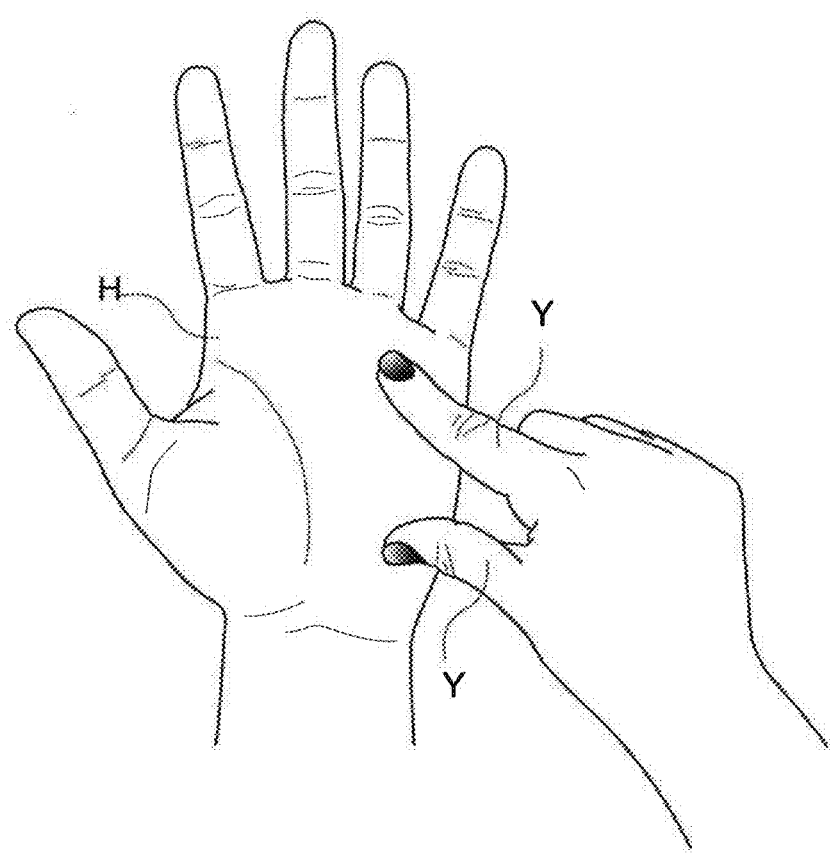
FIG. 13 A schematic diagram showing the shape of the operation body.

At this time, the input control unit 106 may determine the type of the operation by using the object recognition result acquired from the object recognition processing unit 104. FIG. 13 is a schematic diagram showing the shape of a finger as the operation body. In the case where a particular shape of the operation body (e.g., orientation of the finger) is registered in the object recognition dictionary D in advance, the object recognition processing unit 104 supplies the information to the input control unit 106. The input control unit 106 is capable of using the shape of the operation body for determination of the type of operation. For example, in the example shown in FIG. 13, the object recognition processing unit 104 can recognize that the shape of the fingers is a shape for the pinching operation (U-shape formed by the thumb and the index finger), and the input control unit 106 can determine that the operation is a pinching operation only in the case where the shape of the fingers is a shape for the pinching operation.

The input control unit 106 controls an operation input depending on the type of the operation by the operation body. At this time, the input control unit 106 may change the degree of effects (cursor movement speed, a scroll speed, etc.) by dragging depending on the degree of the pressing force of the operation body on the target object. Further, also in the case where the contact position between the operation body and the target object is not moved, the input control unit 106 may control the direction of an operation input depending on the direction of pressing force of the operation body on the target object. In this case, the user is capable of performing an operation input without moving the contact position of the operation body as if he/she operates a pointing stick.

Figure 14:
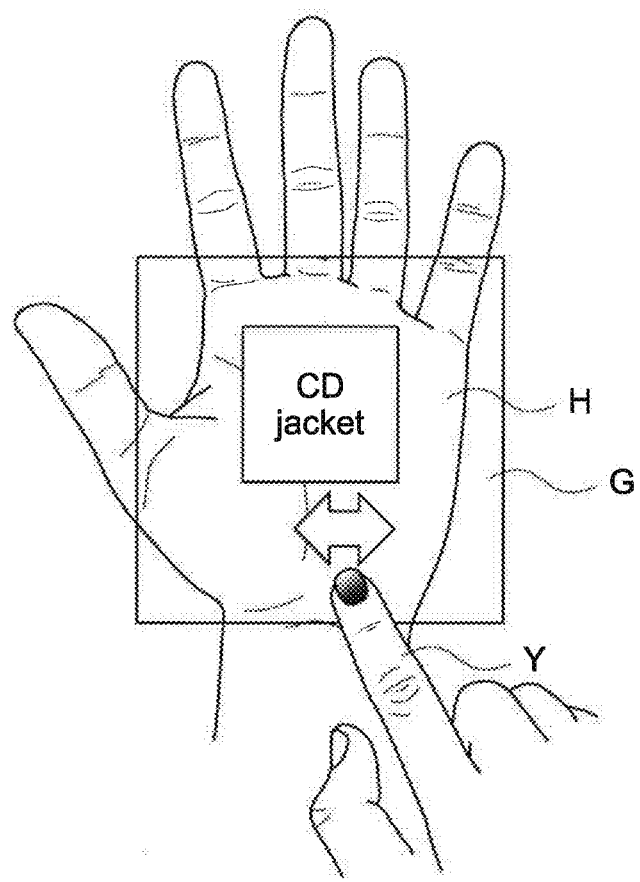
FIG. 14 A schematic diagram showing the state of an operation input by the operation body.

FIG. 14 shows an example of the UI of a music reproduction application by the above-mentioned operation of the information processing apparatus 100. As shown in the figure, the information processing apparatus 100 is capable of selecting the sound volume, music to be reproduced, or the like, depending on the direction or degree of pressing of the operation body on the target object.

Second Embodiment

An information processing apparatus according to a second embodiment of the present technology will be described.

(Configuration of Information Processing Apparatus)

Figure 15:
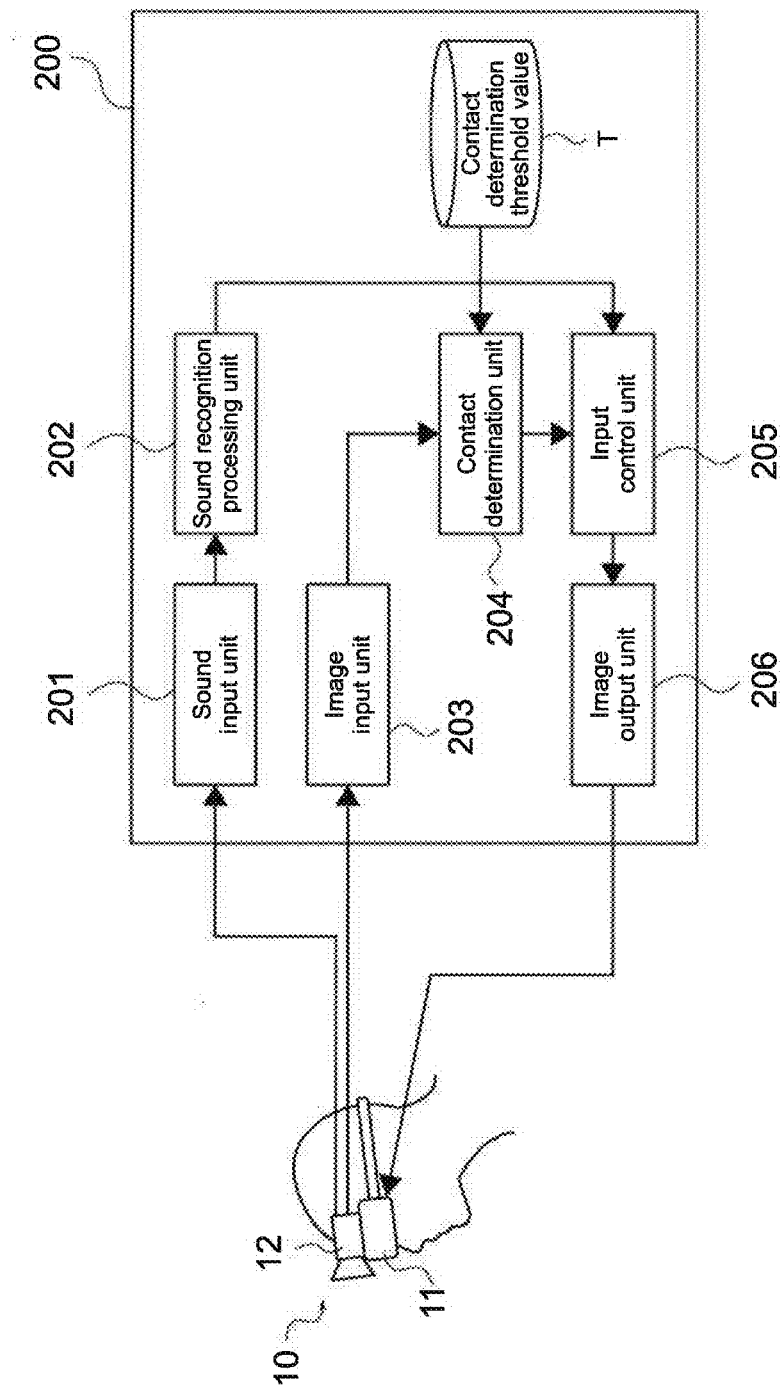
FIG. 15 A schematic diagram showing the configuration of an information processing apparatus according to a second embodiment of the present technology.

FIG. 15 is a schematic diagram showing the functional configuration of an information processing apparatus 200 according to the second embodiment of the present technology. As shown in the figure, the information processing apparatus 200 includes a sound input unit 201, a sound recognition processing unit 202, an image input unit 203, a contact determination unit 204, an input control unit 205, and an image output unit 206. The information processing apparatus 200 according to this embodiment includes no object recognition processing unit.

As shown in the figure, the information processing apparatus 200 can be connected to the eyewear 10. Because the configuration of the eyewear 10 is similar to that in the first embodiment, description thereof will be omitted.

The sound input unit 201 is connected to the microphone of the eyewear 10. The audio signal of a sound collected by the microphone is input to the sound input unit 201. The sound input unit 201 outputs the acquired audio signal to the sound recognition processing unit 202.

The sound recognition processing unit 202 performs audio recognition processing on the audio signal supplied from the sound input unit 201, and recognizes the operation sound by a user. In the case where the operation sound is recognized, the sound recognition processing unit 202 supplies the audio recognition result to the input control unit 205.

The image input unit 203 is connected to the camera 12. An image (moving image) picked up by the camera 12 is input to the image input unit 203. The image input unit 203 supplies the image acquired from the camera 12 (hereinafter, acquired image) to the contact determination unit 204.

The contact determination unit 204 performs contact determination on the acquired image supplied from the image input unit 203 by using the contact determination threshold value T. Details of this processing will be described later. The contact determination unit 204 supplies the determination result to the input control unit 205. The contact determination threshold value T may be stored in the information processing apparatus 200, or the contact determination unit 204 may acquire the contact determination threshold value T from a network or the like.

The input control unit 205 controls an operation input by a user on the basis of the recognition result supplied from the sound recognition processing unit 202 or the determination result supplied from the contact determination unit 204. Specifically, the input control unit 205 receives the contact position, pressing force, or pressing direction of an operation body with a target object, movement of an operation body after the contact, or the like, as an operation input of touching, multi-touching, dragging, pinching, or the like. The input control unit 205 supplies the received operation input to the OS of the information processing apparatus 200 or the like.

The image output unit 206 generates an image (moving image) displayed on the display 11. The image output unit 206 is capable of generating an operation image including an icon and an operation button. Similarly to the first embodiment, the user visually confirms the field of view in which videos displayed on the display 11 and the real object are superimposed one another (see FIG. 2 and FIG. 3).

The information processing apparatus 200 may be connected to an apparatus including a camera capable of displaying or projecting videos on the target object and imaging the target object, in addition to the eyewear 10.

The above-mentioned functional configuration of the information processing apparatus 200 may be connected or incorporated to/in an image projection apparatus such as an eyewear and a projector, or mounted on a PC, smartphone, or the like different from the image projection apparatus. Further, the whole or a part of the functional configuration may be on a network.

The above-mentioned functional configuration of the information processing apparatus 200 can be achieved by the hardware configuration shown in the first embodiment.

(Contact Determination Operation of Information Processing Apparatus)

Figure 16:
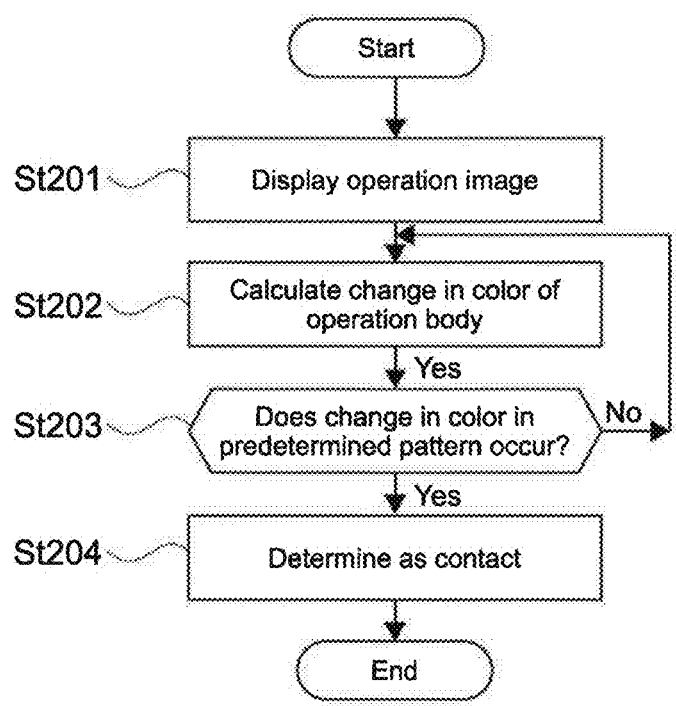
FIG. 16 A flowchart showing an operation of the information processing apparatus.

An operation of the information processing apparatus 200 will be described. FIG. 16 is a flowchart showing the operation of the information processing apparatus 200. As described above, the camera 12 picks up an image, and the image (acquired image) is acquired by the image input unit 203. The image input unit 203 supplies the acquired image to the contact determination unit 204.

The image output unit 206 supplies the operation image G (see FIG. 2) to the display 11, and causes the display 11 to display the operation image G (St201). In contrast to the first embodiment, recognition processing of the target object is not performed. However, the user is capable of aiming the display 11 at the target object (desk or wall surface), thereby projecting the operation image G on the target object.

The contact determination unit 204 calculates the change in a color of the operation body (St202). Note that the contact determination unit 204 is capable of calculating the change in a color set in advance (hereinafter, determination target color). The determination target color is, for example, a color corresponding to the color of a finger. The color of a stylus that is assumed to be used may be used as the determination target color. By using the determination target color, the contact determination unit 204 is capable of identifying the color whose change is expected to be calculated without performing recognition processing of the operation body. Note that the determination target color may have a certain latitude (pixel value range). Further, a plurality of colors may be used as the determination target color.

The contact determination unit 204 compares the change in a color of the operation body (the determination target color) with the contact determination threshold value T, and determines that the operation body is in contact with the target object (St204) when the change in the color is a change in a predetermined pattern defined by the contact determination threshold value T (St203: Yes). In the case where there are a plurality of areas of the determination target color, the contact determination unit 204 is capable of regarding that there are a plurality of operation bodies and determining contact for each operation body.

The pattern of a change in a color (the contact determination threshold value T) used by the contact determination unit 204 for determination may be determined in accordance with a some kind of rule or machine learning in which contact determination is repeated for many subjects. Further, the contact determination unit 204 may store the tendency of the color of a fingertip of a user using the information processing apparatus 200, and perform calibration of the contact determination threshold value T.

In the case where the change in a color of the target object is not a change in the predetermined pattern (St203: No), calculation of the change in a color of the operation body (the determination target color) (St202) is performed again.

In the case where contact of the operation body with the target object is determined, the contact determination unit 204 supplies, to the input control unit 205, the contact position with the acquired image. The input control unit 205 controls an operation input on the basis of the contact determination result supplied from the contact determination unit 204.

The information processing apparatus 200 performs such an operation. As described above, the information processing apparatus 200 performs contact determination by using an image picked up by a normal camera. Specifically, it does not need to provide a contact detection means such as a 3D sensor and a stereo camera, and it is possible to reduce the size of the device and the cost. Further, because the change in a color of the target object does not occur unless the operation body is in contact with the target object, i.e., the information processing apparatus 200 performs contact determination only in the case where the operation body is certainly in contact with the target object, it is possible to receive an operation input with high precision.

Note that although the case where a finger is the operation body has been described above, the operation body is not limited to the finger. For example, in the case where a stylus is the operation body, contact determination may be performed by using the change in a color of the stylus due to deformation of the stylus caused by contact with the target object. Alternatively, a stylus whose color is changed or a stylus that emits light when the stylus is in contact with something may be used as the operation body.

Further, although the contact determination unit 204 performs contact determination by using the change in a color of the operation body in the above description, this is not limited thereto. Contact determination may be performed by using the change in a color of the target object. For example, the contact determination unit 204 may perform contact determination by using the change in a color of a palm, liquid crystal display, or the like. Further, the contact determination unit 204 may perform contact determination by using the change in a color due to this deformation of the target object.

Further, the contact determination unit 204 may perform contact determination by using the change in a color of the shadow of the operation body as the determination target color. The contact determination unit 204 is capable of determining contact by using a color (shadow) darker than the surrounding color as the determination target color, for example.

The information processing apparatus 200 performs such an operation. Note that the information processing apparatus 200 may perform contact determination (see FIG. 9) by using the change in a color and depth information, similarly to the first embodiment. Further, the information processing apparatus 200 may determine the type of the operation by contact after the contact determination (see FIG. 10).

It should be noted that the present technology may take the following configurations.

(1)

An information processing apparatus, including
a contact determination unit that determines contact of an operation body with a target object on the basis of a change in a color of an image including the target object and the operation body.

(2)

The information processing apparatus according to (1) above, further including
an object recognition processing unit that recognizes the operation body included in the image, in which
the contact determination unit determines contact of the operation body with the target object on the basis of a change in a color of the operation body.

(3)

The information processing apparatus according to (1) or (2) above, in which
the object recognition processing unit uses an object detection dictionary to recognize the operation body.

(4)

The information processing apparatus according to any one of (1) to (3) above, in which
the object recognition processing unit recognizes an object that has entered the image as the operation body.

(5)

The information processing apparatus according to any one of (1) to (4) above, in which
the contact determination unit determines contact of the operation body with the target object on the basis of a change in a predetermined color.

(6)

The information processing apparatus according to any one of (1) to (5) above, in which
the predetermined color is a color corresponding to a color of a finger of a fingertip.

(7)

The information processing apparatus according to any one of (1) to (6) above, in which
the contact determination unit determines contact of the operation body with the target object on the basis of a change in a color of the operation body.

(8)

The information processing apparatus according to any one of (1) to (7) above, in which
the contact determination unit determines contact of the operation body with the target object on the basis of a change in a color of the target object.

(9)

The information processing apparatus according to any one of (1) to (8) above, in which
the contact determination unit determines contact of the operation body with the target object on the basis of a change in a color of the target object due to a shadow of the operation body.

(10)

The information processing apparatus according to any one of (1) to (9) above, in which
the contact determination unit further determines a degree of contact of the operation body on the target object on the basis of the change in the color of the image.

(11)

The information processing apparatus according to any one of (1) to (10) above, in which
the contact determination unit further determines a direction of contact of the operation body with the target object on the basis of the change in the color of the image.

(12)
The information processing apparatus according to any one of (1) to (11) above, further including
an input control unit that controls an operation input on the basis of a determination result of the contact determination unit.

(13)
The information processing apparatus according to any one of (1) to (12) above, further including
an image output unit that generates an operation target image superimposed on the target object, in which
the input control unit controls an operation input on the basis of a contact position between the operation body and the target object in the operation target image.

(14)
The information processing apparatus according to any one of (1) to (13) above, further including
an object recognition processing unit that recognizes the operation body included in the image, in which
the input control unit controls an operation input on the basis of a shape of the operation body recognized by the object recognition processing unit and a determination result of the contact determination unit.

(15)
The information processing apparatus according to any one of (1) to (14) above, further including
an object recognition processing unit that recognizes the target object included in the image, in which
the contact determination unit determines contact of the operation body with the target object on the basis of the change in the color of the image when the target object is a rigid body and contact of the operation body with the target object on the basis of a direction of a normal line on a surface of the target object acquired by a normal line direction detection sensor when the target object is not a rigid body.

(16)
The information processing apparatus according to any one of (1) to (15) above, in which
the contact determination unit determines contact of the operation body with the target object on the basis of the change in the color of the image when a distance between the target object and the operation body acquired by a depth sensor is equal to or less than a predetermined value.

(17)
A program that causes an information processing apparatus to function as
a contact determination unit that determines contact of an operation body with a target object on the basis of a change in a color of an image including the target object and the operation body.

(18)
An information processing method, including
determining, by a contact determination unit, contact of an operation body with a target object on the basis of a change in a color of an image including the target object and the operation body.

DESCRIPTION OF REFERENCE NUMERALS 100, 200 information processing apparatus
101, 201 sound input unit
102, 202 audio recognition processing unit
103, 203 image input unit
104 object recognition processing unit
105, 204 contact determination unit
106, 205 input control unit
107, 206 image output unit

The invention claimed is:

1. An information processing apparatus, comprising:
an image input unit that acquires an image including an operation body and a target object;
a contact determination unit that determines contact of the operation body with the target object and a degree of a pressing force of the operation body on the target object on the basis of a change in a color of the image; and
an input control unit that controls an operation of the information processing apparatus on the basis of a result of at least one of the determination regarding the contact or the determination regarding the pressing force,
wherein the image input unit, the contact determination unit, and the input control unit are each implemented via at least one processor.

2. The information processing apparatus according to claim 1, further comprising:
an object recognition processing unit that recognizes the operation body included in the image,
wherein the contact determination unit determines contact of the operation body with the target object on the basis of a change in a color of the operation body, and
wherein the object recognition processing unit is implemented via at least one processor.

3. The information processing apparatus according to claim 2, wherein the object recognition processing unit uses an object detection dictionary to recognize the operation body.

4. The information processing apparatus according to claim 2, wherein the object recognition processing unit recognizes an object that has entered the image as the operation body.

5. The information processing apparatus according to claim 1, wherein the contact determination unit determines contact of the operation body with the target object on the basis of a change in a predetermined color.

6. The information processing apparatus according to claim 5, wherein the predetermined color is a color corresponding to a color of a finger of a fingertip.

7. The information processing apparatus according to claim 1, wherein the contact determination unit determines contact of the operation body with the target object on the basis of a change in a color of the operation body.

8. The information processing apparatus according to claim 1, wherein the contact determination unit determines contact of the operation body with the target object on the basis of a change in a color of the target object.

9. The information processing apparatus according to claim 1, wherein the contact determination unit determines contact of the operation body with the target object on the basis of a change in a color of the target object due to a shadow of the operation body.

10. The information processing apparatus according to claim 1, wherein the contact determination unit further determines a direction of contact of the operation body with the target object on the basis of the change in the color of the image.

11. The information processing apparatus according to claim 1, wherein the input control unit further controls an operation input on the basis of at least one of the determination regarding the contact or the determination regarding the pressing force.

12. The information processing apparatus according to claim 11, further comprising,
an image output unit that generates an operation target image superimposed on the target object,
wherein the input control unit controls an operation input on the basis of a contact position between the operation body and the target object in the operation target image, and
wherein the image output unit is implemented via at least one processor.

13. The information processing apparatus according to claim 11, further comprising:
an object recognition processing unit that recognizes the operation body included in the image,
wherein the input control unit controls an operation input on the basis of a shape of the operation body recognized by the object recognition processing unit and at least one of the determination regarding the contact or the determination regarding the pressing force, and
wherein the object recognition processing unit is implemented via at least one processor.

14. The information processing apparatus according to claim 1,
wherein the contact determination unit determines contact of the operation body with the target object on the basis of a direction of a normal line on a surface of the target object acquired by a normal line direction detection sensor when the target object is not a rigid body.

15. The information processing apparatus according to claim 1, wherein
the contact determination unit determines contact of the operation body with the target object on the basis of the change in the color of the image when a distance between the target object and the operation body acquired by a depth sensor is equal to or less than a predetermined value.

16. A non-transitory computer-readable medium having embodied thereon a program, which when executed by a computer causes the computer to execute a method, the method comprising:
acquiring an image including an operation body and a target object;
determining contact of the operation body with the target object and a degree of a pressing force of the operation body on the target object on the basis of a change in a color of the image; and
controlling an operation of the computer on the basis of a result of at least one of the determination regarding the contact or the determination regarding the pressing force.

17. An information processing method, the method being executed by an information processing apparatus, and comprising:
acquiring, an image including an operation body and a target object;
determining contact of the operation body with the target object and a degree of a pressing force of the operation body on the target object on the basis of a change in a color of the image; and
controlling an operation of the information processing apparatus on the basis of a result of at least one of the determination regarding the contact or the determination regarding the pressing force.

18. The information processing apparatus according to claim 14, further comprising:
an object recognition processing unit that recognizes the target object included in the image,
wherein the contact determination unit determines contact of the operation body with the target object on the basis of the change in the color of the image when the target object is a rigid body, and
wherein the object recognition processing unit is implemented via at least one processor.

* * * * *